INVENTORS
T. H. COEL
E. B. HANFORD
S. H. STEWART
ATTORNEY

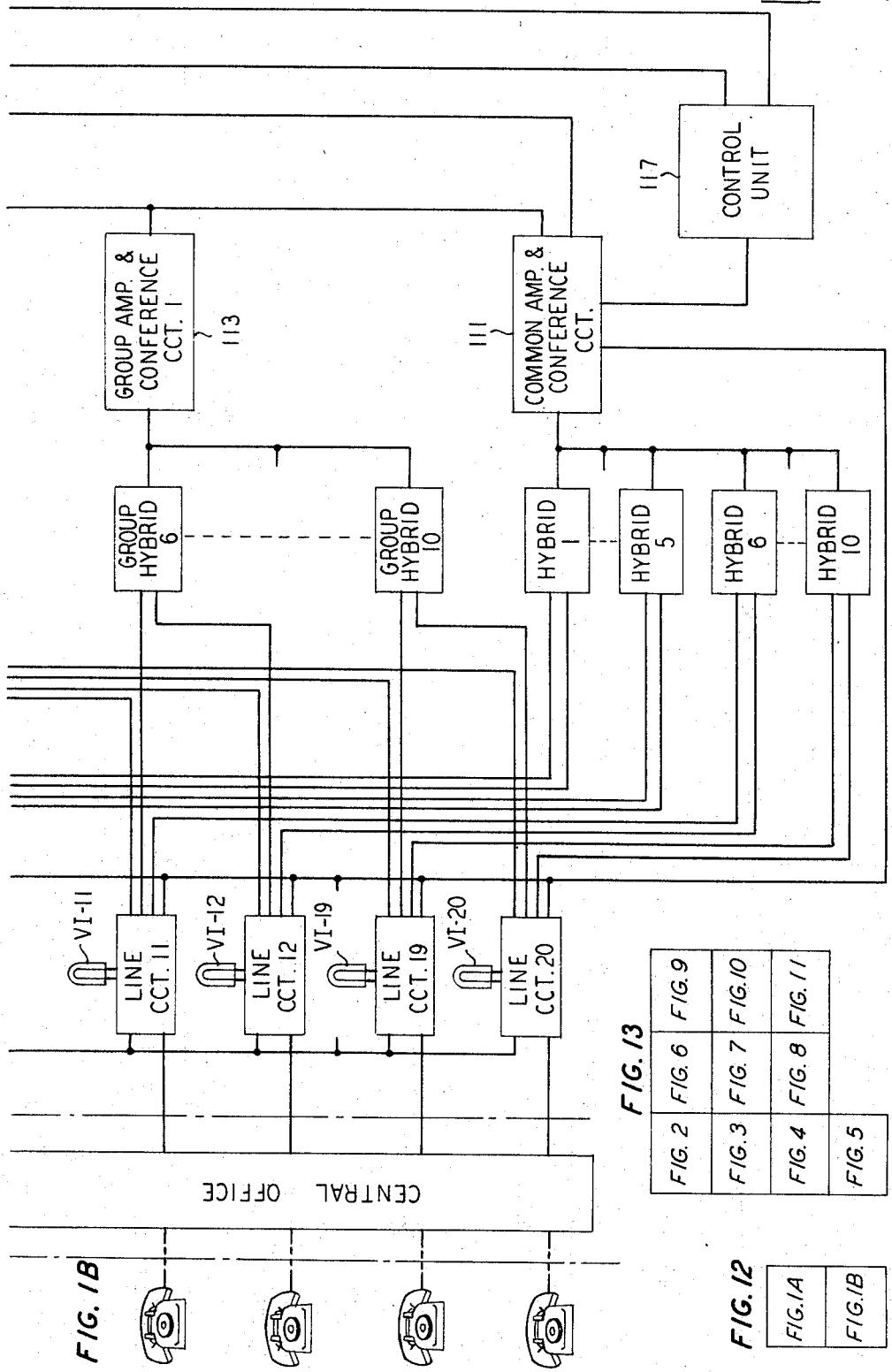

United States Patent Office 3,423,532
Patented Jan. 21, 1969

3,423,532
INTERCOMMUNICATION SYSTEM FOR SCHOOL-TO-HOME TEACHING
Trafford H. Coel, Belmont, Eugene B. Hanford, Oakland, and Stanley H. Stewart, Walnut Creek, Calif., assignors to American Telephone and Telegraph Company, New York, N.Y., a corporation of New York
Filed Nov. 1, 1965, Ser. No. 505,822
U.S. Cl. 179—1         8 Claims
Int. Cl. H04m 7/00

ABSTRACT OF THE DISCLOSURE

A school-to-home conference arrangement. A control console at school permits teacher to conference up to 20 students and provides a lamp indicator for detecting voice signals on the respective student's line. The console also provides the teacher with "release," "grouping," "group talk" and "split" control. In "grouping," more than one separate conference is set up and the teacher may confer with each group separately by way of her "group talk" control. To eliminate three-way conversation between student, student and teacher the split control is actuated which allows only a student-teacher communication.

---

This invention relates to an intercommunication system and more particularly to an intercommunication system for school-to-home teaching.

In recent years school-to-home intercommunication system have been used in increasing numbers for providing instruction to homebound students. In some instances the student may be confined to his home only for a relatively short period and the home teaching service may be needed only temporarily to keep the student from falling back of his class. In other instances the confinement may be of a more extended nature and the service is then important not only from an educational standpoint, but also for the social and psychological advantages that obviously are provided.

The equipment provided customarily includes an intercom unit adapted for use with telephone equipment which is positioned on or near the teacher's desk in the classroom. The sounds picked up in the classroom are amplified as required and then transmitted over a telephone line to a suitable telephone set in the room of the shut-in. When the connection has been completed the homebound student can hear everything that goes on in the classroom; switching means, either manually operated or operated by voice energy, are included whereby the student can recite in turn or answer questions as directed by the teacher.

While the school-to-home teaching systems with their increased use have provided a very valuable service to shut-in students, it has at the same time become apparent that certain unsatisfactory and imperfect details prevail in the use of such systems thus so far known. For example, certain of the prior systems have lacked flexibility with regard to the "assembling" of different groups of home students for different class periods, while others of the prior systems have been unsatisfactory from the standpoint of transmimssion loss resulting from the connection of the home lines. Further, it has been found that while a class conference is being held, it is often difficult for the teacher to quickly identify which particular home student is speaking at a particular time, that is which particular line is carrying voice at the moment. This is true, also, with regard to the presence of noise of an objectionable level such as may arise from a poor connection or, on occasion, from some action on the part of a home student.

Accordingly it is an object of our invention to improve the operation of school-to-home intercommunication systems.

A more specific object of the invention is to indicate the particular line or lines of the system upon which the noise level is unsatisfactorily high.

A still further specific object of the invention is to identify the particular line or lines upon which speech energy is present at a given moment.

In accordance with a specific embodiment of the invention a switching or "teaching" console is provided at the school which permits the teacher to dial through the normal central office switching facilities a maximum of twenty outlying home stations whereby to conduct classes on a full conference basis with these stations. Each line circuit of the system, that is the line circuits connectable with the respective selected home stations, makes use of the speakerphone voice-switching capabilities; this is accomplished by the physical inclusion in each line circuit of the basic speakerphone elements, as disclosed, for example, in W. F. Clemency Patent 3,046,354, July 24, 1962, and W. F. Clemency et al. Patent 3,171,901, Mar. 2, 1965 and in the article, "Functional Design of a Voice-Switched Speakerphone" by W. F. Clemency and W. D. Goodale, Jr., Bell System Technical Journal, May 1961, page 649. Visual signaling means are associated with each line whereby the teacher is enabled to identify immediately a particular line having voice or excessive noise thereon at a given moment.

A feature of the invention is a visual signal in association with each line whereby to provide indication of each line having voice or excessive noise thereon at a given moment.

A further feature of the invention is means for inhibiting the effect of slowly varying noise waves on the operation of said visual signals.

A full understanding of the arrangement contemplated by the present invention as well as an appreciation of the various features thereof may be gained from consideration of the following detailed description in connection with the accompanying drawings in which:

FIGS. 1A and 1B show schematically the relationship of the various individual circuits which comprise one specific illustrative embodiment of the intercommunication system contemplated by the invention;

FIGS. 12 and 13 show the manner in which certain of the figures should be arranged to show the specific illustrative embodiment of the invention.

General description

Figure 1A:
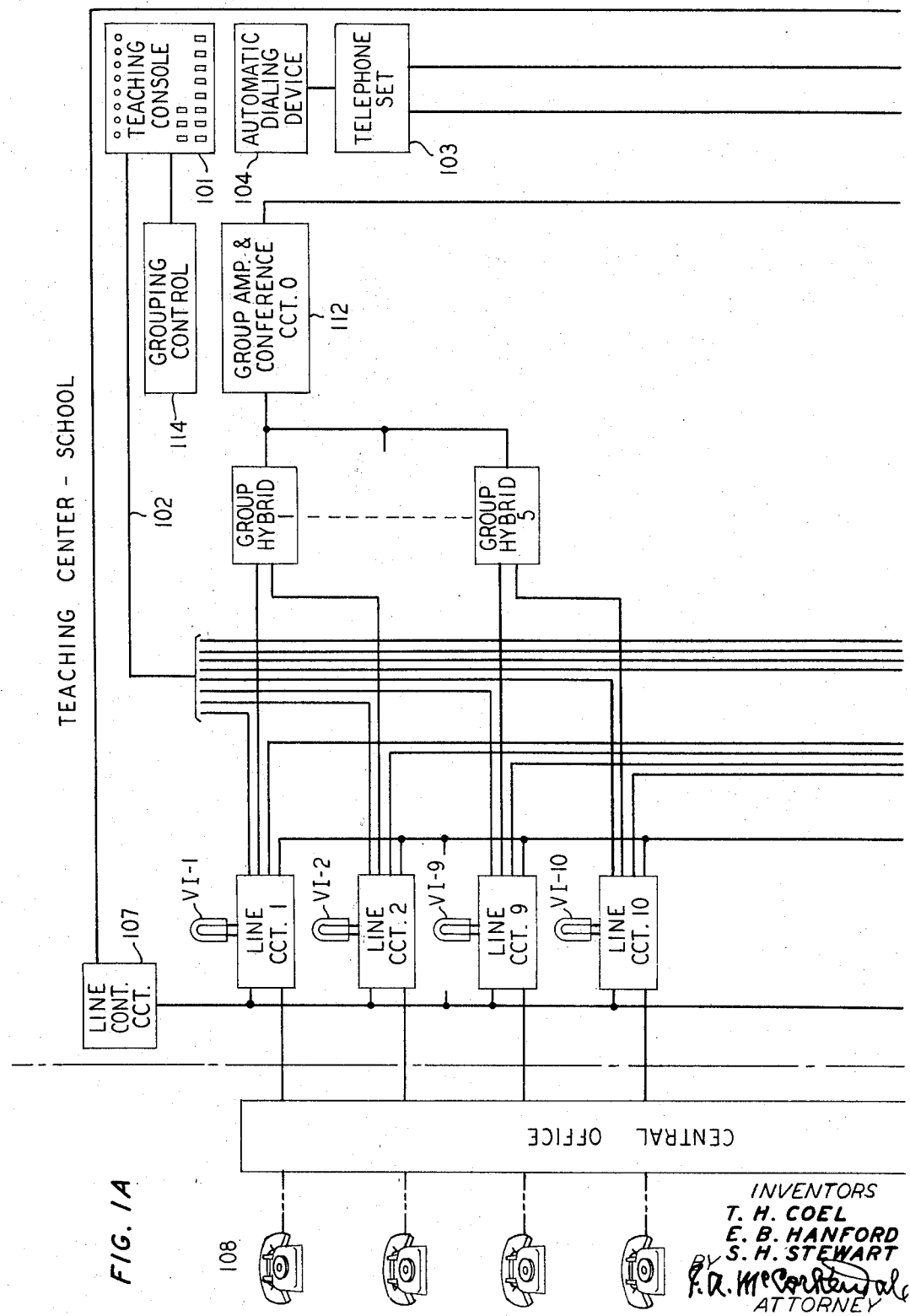
Figure 2:
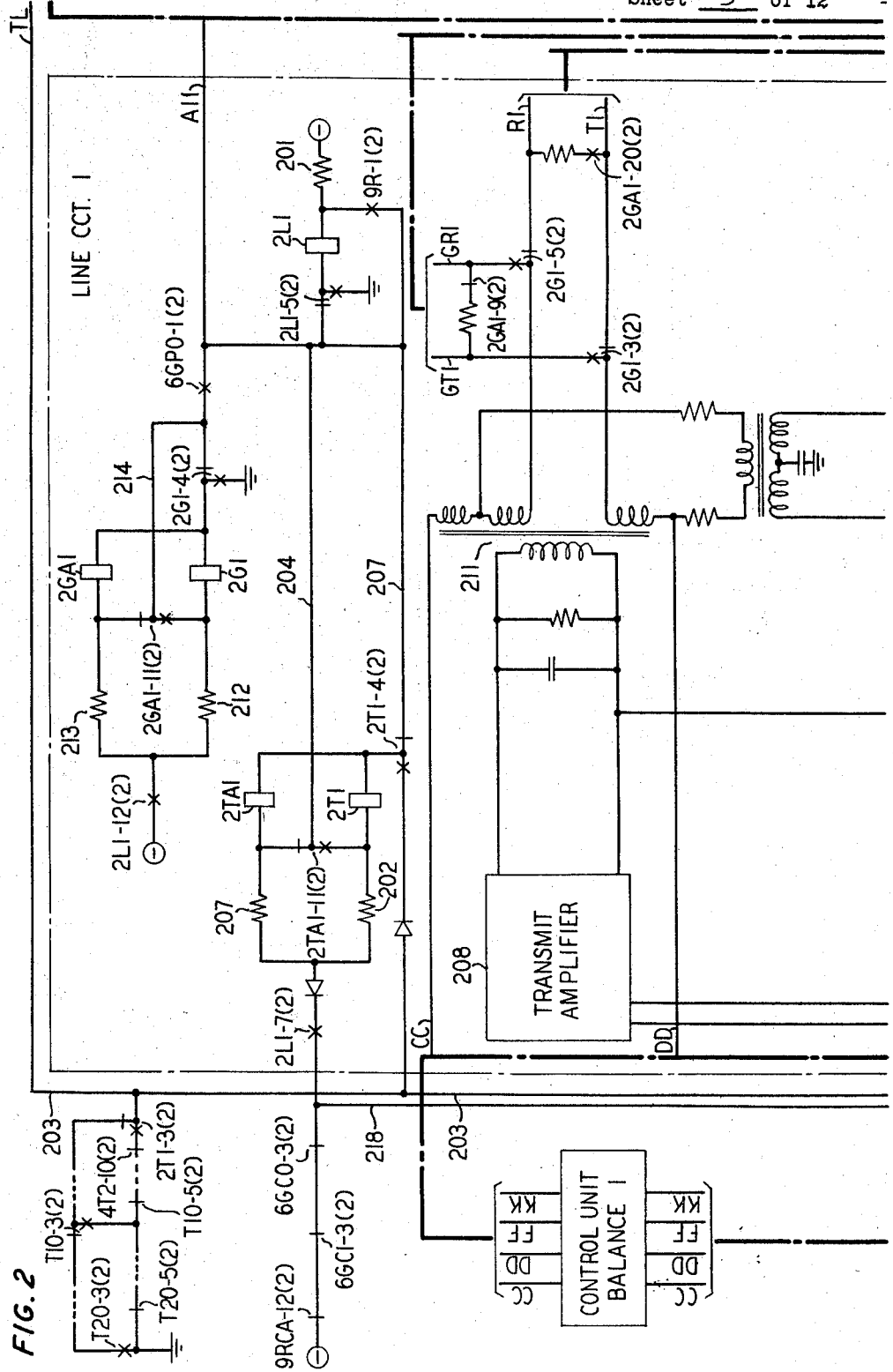
FIGS. 2 and 3 show the arrangement of a first line circuit.
Figure 3:
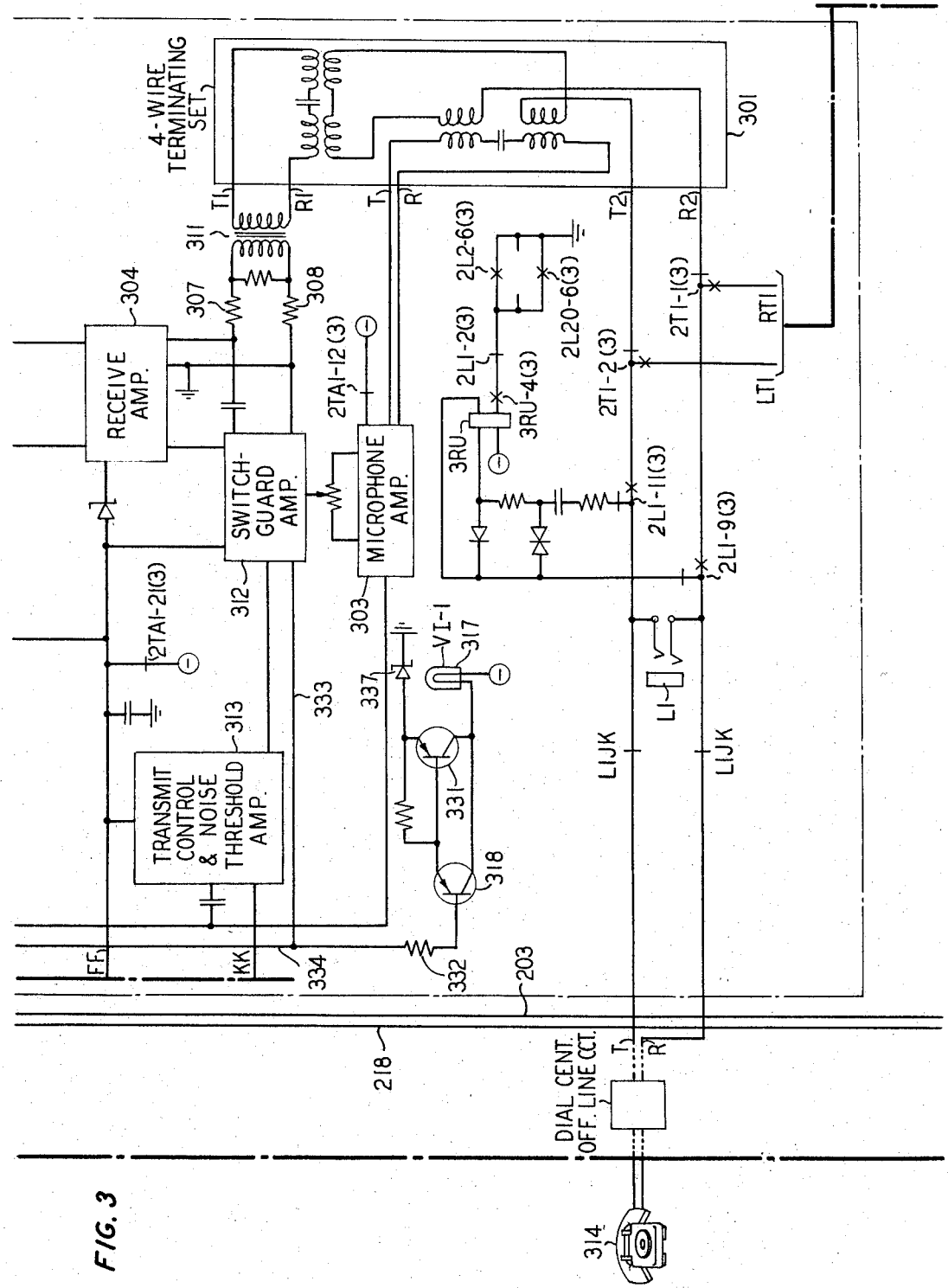
Figure 4:
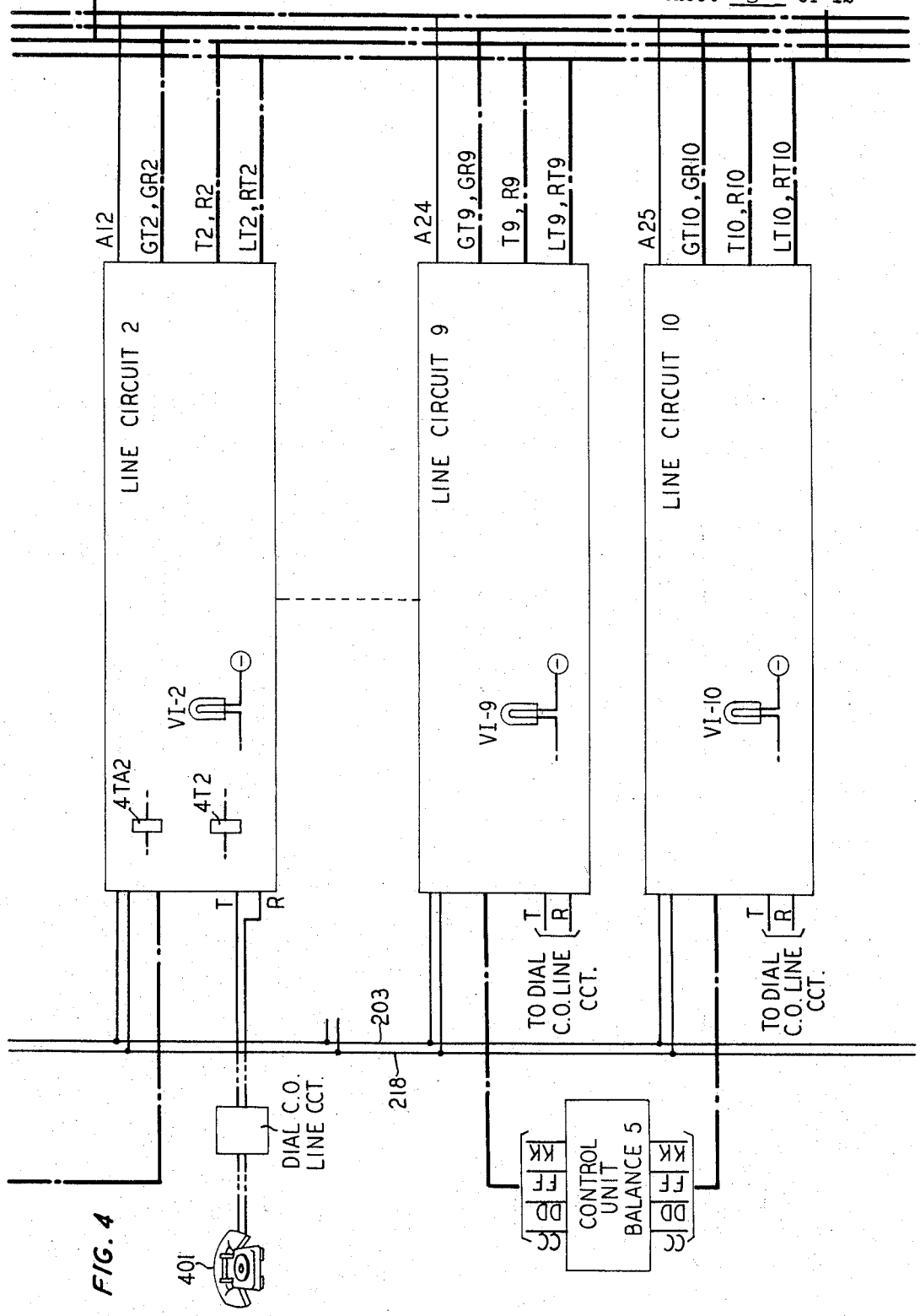
FIGS. 4 and 5 show schematically the arrangement of the other line circuits, certain of the circuits being shown only in part or indicated by captioned boxes while certain intervening circuits are indicated only by dotted lines.
Figure 5:
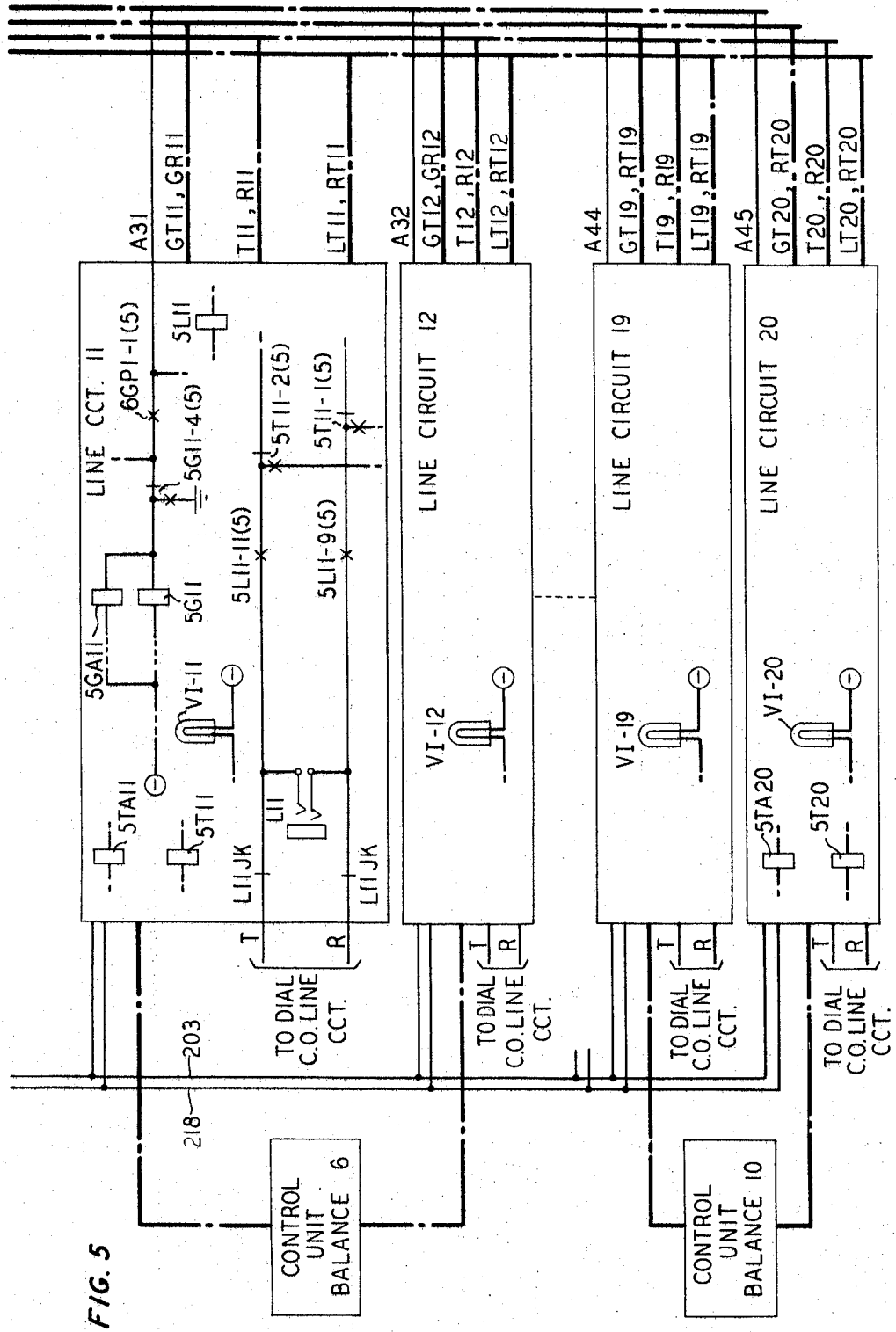
Figure 6:
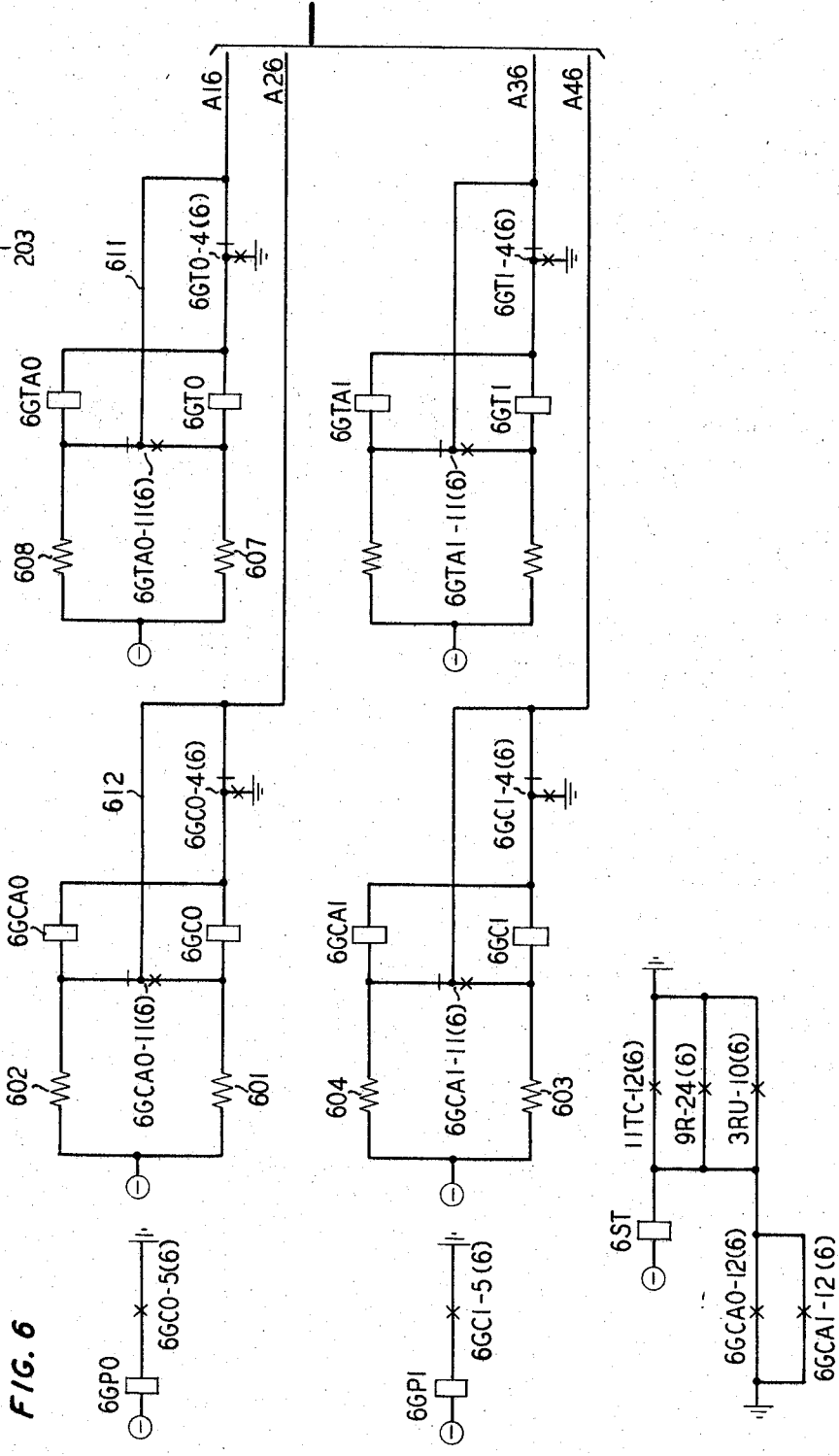
FIG. 6 shows particularly the grouping control circuit and the control of the connection of the attendant (teacher) to the grouping control circuit.

The arrangement and operation of the various components of the illustrative embodiment of the invention will be described in detail subsequently with reference to FIGS. 2 to 11 inclusive. However, in order to first gain a general over-all understanding of the arrangement contemplated, a brief general description will be given at this point with reference to FIGS. 1A and 1B.

A teaching console 101 is shown schematically at the teaching center, usually a school, which controls through suitable leads, represented by bracketed line 102, the selection of the respective line circuits also located at the teaching center. In the illustrative embodiment of the invention a maximum of twenty lines may be selected in turn and included in the class conference. The teaching console is provided with a line key and line lamp for each line together with certain other keys and lamps involved in operation of the system. Among the other keys provided are RLS (release), GRP0 and GRP1 (grouping), GRP0 TLK and GRP1 TLK (group talk) and SPL (split); in most instances a corresponding lamp is provided for each key.

Also provided in association with teaching console 101 are a telephone set 103, which may be of the speakerphone type as disclosed in the W. F. Clemency patents and the descriptive article referred to above, and a suitable dialing device 104, preferably of the card dialer type as disclosed, for example, in E. R. Andregg et al. Patent 3,189,692, June 15, 1965.

The attendant, or teacher, in setting up a class conference selects the first line circuit, assumed to be line circuit No. 1, by closing the corresponding line key on the teaching console 101. Through operation of line control circuit 107 and other circuit operations which will be described subsequently in connection with the detailed description of the illustrative embodiment, a loop is closed to the central office and the line lamp on the console flashes as an indication that the line is in "dial condition." The teacher then operates dial 104 to transmit the code of the first student phone to be joined in the class conference; it will be assumed that student's station set 108 is the first to be added.

While the student's station sets have been illustrated as hand telephone sets, other types of available sets may, of course, be used as desired. For example "hands free" telephones may be utilized if more convenient to the student.

The use of a card dialer for transmitting the numbers of the students facilitates assembling the class since the code cards for the entire class may be grouped and placed in calling order in the device before dialing is started.

When the called student responds by going off-hook at his station set 108, his station line is connected by way of line circuit No. 1 and the associated hybrid No. 1 to the common amplifier and conference circuit 111. It will be noted that two line circuits are associated with each regular hybrid and with each group hybrid. Thus line circuit No. 1 and line circuit No. 2 are associated with regular conference hybrid No. 1, and group hybrid No. 1, line circuits Nos. 9 and 10 are associated with regular conference hybrid No. 5 and group hybrid No. 5 and so on. The hybrids are preferably of the resistance type commonly provided whereby incoming and outgoing currents of two two-way paths will be separated and prevented from interfering with each other. Such arrangements are well known in the art.

As pointed out above and as will be described in detail subsequently, each line circuit is provided with the amplifying and voice-switching facilities of the speakerphone. Thus a substantial volume increase is permitted while receiving, and singing and far-end talker echo are eliminated. When there is no transmission of speech, gain is automatically removed from the transmit channel and added to the receive channel of each line circuit. When speech is received, the gain of the transmit channel increases to normal level while the gain of the receive channel is simultaneously decreased to prevent singing which might otherwise result from the increased transmit gain.

The interchange of gain between the receive and transmit channels is effected by control circuits operating on a linear differential basis, that is the channel having the stronger signal at the moment has the higher gain. A circuit referred to as a switchguard and including the switchguard amplifier is bridged across the transmit channel and guards against the possibility that noise will cause false operation of the switching circuit while speech is being received.

In the presence of background noise a special circuit automatically raises the required threshold level in order to prevent operation of the switching control circuit by the noise. This circuit includes the transmit control and noise threshold amplifier and prevents false switching due to background noise resulting from fans, nearby traffic and the like. The circuit distinguishes between the noise and legitimate speech on the basis that speech fluctuates more rapidly than most types of noise. A microphone amplifier, receive amplifier and transmit amplier are also included in the line circuit and perform functions comparable to those of the similarly designated amplifiers of the speakerphone.

As the teacher dials each line in turn she at the same time closes the line key of the next line whereby to select that line for the next connection. As each dialed station answers, the associated line lamp goes to "steady" and the line is transferred in turn to the regular conference. When the last line of the scheduled class is dialed, that line key is again operated momentarily whereby to transfer the line to the regular conference.

After all the dialed student stations have answered and been transferred to the regular conference circuit, the class may then proceed on a full conference basis the teacher addressing the students as a class and individual students reciting or answering questions as directed by the teacher.

Normally, due to the speakerphone voice-switching characteristics provided in the line circuits, all the line circuits are held in "receive" condition so that when the teacher speaks she is heard by all the students over the respective lines. However, when a particular student "breaks in" by speaking, that particular line circuit is switched to "transmit" and that student's voice is heard by the teacher and by all of the other students.

In a system of this nature it is obviously important that the teacher be able to identify immediately a particular student who speaks so that she may respond by calling the student by name. This enhances the prestige of the student since it tends to encourage him as an individual and to avoid a feeling on his part that he is merely an unidentifiable member of a general group. Such a feature is further valuable as it facilitates the task of the teacher in her individual grading and rating of the students. The novel voice identification means contemplated by the present invention will be further referred to below. The immediate detection of a line which is producing objectionable noise is also important in order that the condition may be corrected promptly without undue interference with the class conference.

On occasion the teacher can transfer selected students from the regular or full conference circuit to one of two optional group conference circuits for group discussion or an additional teaching session. A maximum of ten student stations can be connected to each group conference circuit, line circuits No. 1 to No. 10 being connectable to group amplifier and conference circuit 0, represented by box 112, and line circuits No. 11 to No. 20 being connectable to group amplifier and conference circuit No. 1 represented by box 113.

Establishment of a group conference is initiated by the teacher operating the GRP0 or GRP1 (grouping) key provided on console 101 whereby to activate grouping control circuit 114 and prepare the particular group (0 or 1) to accept lines as selected. The line lamps of all the lines to be placed in the selected group are operated momentarily; as each line is transferred to the conference group the associated line lamp lights "steady." When all the lines to be "group conferenced" have been selected the grouping key is again operated momentarily at which point the grouping lamp (GRP0 or GRP1) lights steady as do the line lamps of all the lines that remain in the regular conference circuit; all the line lamps of the lines transferred to the group conference are extinguished.

The teacher may remain in talking connection with the original regular conference or, if she wishes to talk to the separate group established as just described, she operates the GRP0 TLK or GRP1 TLK (group talk) key provided on console 101. This causes the associated group talk lamp to flash and the teacher's telephone circuit is transferred to the selected group conference circuit. A second operation of the same group talk key disconnects the teacher's telephone set from the group conference while a momentary reoperation of a respective line key disconnects the associated line from the group conference and reconnects it to the regular conference circuit.

In some instances it may be found desirable to "split" the regular conference whereby to provide two-way conversation between the students and the teacher only; that is to eliminate student-to-student conversations. In such event, the teacher momentarily operates the SPL (split) key provided on console 101. Through circuit operations, which will be described in detail subsequently, the SPL lamp is lighted steady and the teacher's telephone set is switched to four-wire operation; that is handset or headset operation only rather than speakerphone. Subsequent momentary reoperation of the SPL key disconnects the split feature and extinguishes the SPL lamp.

The contemplated system is so arranged that the teacher is able to remove a selected student line from the regular conference circuit and talk to that student on an individual basis. In order to initiate such action the teacher momentarily operates the line key of the particular line which has been used in connecting the student in the regular conference circuit. The line lamp flashes, the teacher and student are removed from the regular conference circuit and two-way conversation is provided between the particular student and the teacher only. The lines remaining on the regular conference circuit are not affected by this change. A subsequent momentary reoperation of the respective line key is effective to restore the student's line to the regular conference circuit, to light the associated line lamp steady and to reconnect the teacher's telephone set to the regular conference circuit.

During the time a number of different lines are connected to a conference circuit and a class is in progress it may often be desirable as pointed out above that the teacher be able to readily identify at a given moment the particular line which transmitted speech, that is to identify the particular student who may have answered a question or commented on the discussion. Also in the event of objectionable noise it becomes important to identify the particular line which is producing the noise. In accordance with the novel arrangement contemplated, each line is provided with a voice-identification lamp which lights when the associated line is carrying speech energy or noise which exceeds a predetermined energy level. Thus lamp VI–1 is associated with line circuit No. 1, lamp VI–2 is associated with line circuit No. 2 and so on.

It is apparent, of course, that in the normal operation of the conference system, a certain amount of crosstalk and unobjectionable low-level noise will be present on some or all of the lines, and it is desirable that the energy-responsive lamps are not lighted under such conditions alone. Also, it is recognized, of course, that the overall background noise level shifts from time to time and it is particularly desirable in a system of the nature contemplated that the operator, in this case a teacher, be free from the task of making more or less frequent adjustments in the indicating circuit in order to compensate for such changes in level. Accordingly, in accordance with the novel arrangement contemplated, and as will be described in detail subsequently, each indicator lamp is connected at a specific point in the associated line where the sound level, when the circuit is quiescent, is that of normal crosstalk or nonobjectionable noise and the control means for the lamp remains OFF and the lamp does not light. An increase in the sound level resulting from speech on the line or noise of a higher, objectionable level, will turn the switch ON and the associated voice identification lamp will light. As will be described in detail subsequently, it is contemplated that the connection of each voice identification lamp be made to the associated line circuit at a point in parallel with the switchguard amplifier and the transmit amplifier of the respective line circuit since at this point the above sound level characteristic prevails. The control switch, preferably a transistor OFF–ON circuit, is designed with characteristics whereby it remains OFF in the presence of the voltage prevailing at this point of connection when there is no signal input or when the signal level is below the point set by the noise and threshold level control amplifier of the respective line circuit. However, when a signal level above that threshold appears on the input of the transmit amplifier the voltage increases to a point sufficient to turn the switch ON and light the voice identification lamp.

While in order to avoid undue complication of the drawing, each voice identification lamp has been shown in close association with the respective line, it is contemplated that the lamps may be grouped on a suitable housing near or on the teaching console where they may be readily scanned by the teacher. For example the identification lamps may, if desirable, be mounted on the housing of dialing device 104.

Control unit 117 provides certain ground sources, path closing contacts and other control equipment for functioning in associating with the various portions of the system.

*Detailed description*

Coming now to a more detailed description of the specific illustrative embodiment of the invention with particular reference to FIGS. 2 to 11 of the drawing, the circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding or the like is preceded by a numeral indicating the figure of the drawing in which the apparatus appears, for example, winding of relay 3RU appearing in FIG. 3. Further, each contact designation is followed by a numeral in parentheses which indicates the figure of the drawing in which the contact appears, for example the designation "3RU–10(6)" indicates that conact No. 10 of relay 3RU appears in FIG. 6 while the relay winding, as pointed out above, appears in FIG. 3. In accord with the usual circuit design, transfer contact pairs may be either early make-break (continuity) or early break-make (sequence transfer) as dictated by the particular circuit operational requirements.

*Line seizure—Originating a call to a home student*

For purposes of further description it will be assumed now that a class is to be conference grouped, that the first student's station set to be called is station set 314, and that line circuit No. 1 is to be utilized for the purpose.

Relay 11BC0 operates, when the teacher's telephone set 1101 is actuated, from ground supplied from control unit 1102. Relay 11BC0 operated, removes at break contacts 11BC0–8(11) and 11BC0–10(11) battery and ground from inductor 11TB and cuts through at the make contacts of transfer pairs 11BC0–11(11) and 11BC0–12(11) and T and R leads to the regular conference common amplifier circuit, capacitors 1103 and 1104 being bypassed.

The teacher, in order to seize line circuit No. 1, now closes line key No. 1 (FIG. 9) on the teacher's console; line relay 2L1 operates from ground applied to lead 1107 from control unit 1102, closed contact of No. 1 line key, lead A11, through cabling indicated by heavy dash-dot line, break contact of transfer pair 2L1–5(2), winding of relay 2L1, resistor 201 to battery. Relay 2L1 upon operating locks to ground through the make contact of transfer pair 2L1–5(2). Relay 2T1 operates following operation of relay 2L1, from the ground on lead A11, lead 207, break contact of transfer pair 2T1–4(2), winding of relay 2T1, resistor 202, make contact 2L1–7(2), break contacts 6GC0–3(2), 6GC1–3(2), and 9RCA–12(2) to battery.

Relay 2L1, operated, closes at make contacts of respective transfer pairs 2L1–9(3) and 2L1–11(3) a loop to the dial central office line circuit through the tip and ring leads of the four-wire terminating set 301 which is associated with line circuit No. 1. Terminating set 301 may be any one of the various types of hybrid arrangements well known in the art and commonly used when it is desired to terminate a four-wire circuit on a two-wire basis for interconnection with two-wire circuits.

Relay 2T1, operated, locks through the make contact of its transfer pair 2T1–4(2) to ground applied to lead 203 through break contacts of higher numbered T relays (not shown) as T–10 and T–20, and through make contact of transfer pair 2T1–3(2). Also the ground applied to lead 203 operates relay 11TC over an obvous path and is also supplied as a holding ground for relay 11BC0.

Relay 11TC, operated, connects the respective make contacts of transfer pairs 11TC–2(8) and 11TC–3(8) the T and R leads from the teacher's console position through leads LT1 and LRL1 and the make contacts of transfer pairs 2T1–1(3) and 2T1–2(3) to the dial central office line circuit. This connects the talking circuit of the teaching console under control of the line seized. Also, relay 11TC, operated, connects at make contact 11TC–1(8) resistor 801 across connecting line 804 of the regular conference common amplifier circuit as an idle line termination, and closes at make contact 11TC–12(6) an operate path for relay 6ST.

Relay 6ST, operated, closes at make contact 6ST–1(10) an operate path for interrupter motor 1001 whereby to start operation of the interrupter.

At this point line lamp No. 1 is lighted steady from source 1002, break contacts of respective transfer pairs 6GC0–1(10) and 2GA1–12(10), make contact 2LI–1(10), break contact of transfer pair 2TA1–8(10), lead L11, line lamp No. 1, lead 1003 to ground.

While the line key is held closed and ground is applied to leads A11 and 204, relay 2TA1 does not operate since its operate path is shunted to this ground. However, when the teacher releases the line key and the ground is removed, relay 2TA1 then operates from battery, break contacts 9RCA–12(2), 6GC1–3(2) and 6GC0–3(2), make contact 2L1–7(2), resistor 207, winding of relay 2TA1, make contact of transfer pair 2T1–4(2) to the holding ground for relay 2T1 on lead 203. Battery is now supplied through make contact 2TA1–12(3) to microphone amplifier 303.

Now that relay 2TA1 is operated, line lamp No. 1 changes to "flash" from source 1004, interrupter contact INT–7(10), make contact of transfer pair 2TA1–8(10), line lamp No. 1, lead 1003 to ground.

Since the teacher's telephone set is connected to the dial central office line circuit through make contacts of the 11TC and 2T1 relays as previously described, dial tone is now heard in the teacher's telephone set. The teacher now operates dialing device 1108, preferably a card controlled device as mentioned above in reference to FIGS. 1A and 1B, whereby to transmit the directory number of the first student at station 314. As relay 11D is operated from the ground applied to lead 203 through make contact 2T1–3(2), the dial pulses are applied to the line through make contacts 11D–3(11) and 11D–4(11) and the respective make contacts of transfer pairs 11D–2(11) and 11D–1(11), make contacts of transfer pairs 11TC–2(8) and 11TC–3(8), make contacts of transfer pairs 2T–1(3) and 2T1–2(3), and make contacts of transfer pairs 2L1–9(3) and 2L1–11(3).

*Student line transferred to regular conference*

Station 314 is called through the regular central office switching apparatus in the usual manner and, when the student answers, his line is transferred to the regualr conference as now described. In order to bring about the transfer and also to initiate a call to the next student, the teacher closes the next line key on the teacher's console which will be assumed to be key No. 2. The resulting operations are similar to those described above in connection with the initiation of the first call. However, when relay 4T2 of line circuit No. 2 operates (from the ground applied over lead A12), the chain locking path for relay 2T1 is interrupted at break contact 4T2–10(2) of relay 4T2 and relay 2T1 releases.

Relay 2T1, released, releases relay 8TA1 by interrupting the operate path at the make contact of transfer pair 2T1–4(2); with relay 2TA1 released, line lamp No. 1 again is lighted steady [break contact of transfer pair 2TA1–8(10)] as an indication that line No. 1 is now connected to the regular conference circiut. This last-mentioned connection results from release of relay 2T1 as the T2 and R2 conductors of the line are now connected through to four-wire terminating set 301 at the break contacts of transfer pairs 2T1–1(3) and 2T1–2(3). Leads T and R connect the transmit leg of the terminating set to microphone amplifier 303 while leads T1 and R1 connect the receive leg of the terminating set to receive amplifier 304. Resistors 307 and 308 together with transformer 311 act to provide proper match between the termintaing set receive leg and the output coil of receive amplifier 304.

The two amplifiers just referred to together with transmit amplifier 208, switchguard amplifier 312 and transmit control and noise threshold amplifier 313 function in the line circuit in a similar manner to that of the similarly designated amplifiers of the speakerphone as disclosed by the patents and article referred to above. Switchguard amplifier 312, for example, guards against false switching of the received signal while transmit control and noise threshold amplifier 313 prevents operation of the switching control circuit by background noise; it permits a predetermined voice level to switch from the receive to the transmit condition. As described, for example, in the W. F. Clemency et al. Patent 3,171,901 referred to above, the speakerphone circiuts are especially designed to prevent false switching due to background noises which, although in the audible range, are not speech signals. Noise energy emitted by a fan, an air conditioner or road traffic are examples of detectable sounds which fall in this category. Briefly, the speakerphone circuits, and the similar circuits of the present system, are designed to discriminate between speech and backgroud noise on the basis that the former fluctuate rapidly at the syllabic frequency between nulls and relatively high amplitude peaks while the latter varies slowly with time over a relatively small range of amplitudes.

Leads T1 and R1 of transformer 211 connect line circuit No. 1 to its appearance on regular conference hybrid 802 for connection with the respective receive and transmit branches of the regular conference circuit. (The line is also connectable through leads GT1 and GR1 to its place on grouping hybrid 701 but this connection will be described subsequently in reference to setting up group conferences.)

Operation of line key No. 2 as described above is effective to initiate a call to a second student's station set 401 by way of line circuit No. 2 in the same manner described above with reference to the call to station set 314. Station set 401 upon responding is connected by way of the associated four-wire terminating set (not shown) and leads T2 and R2 to its place on hybrid 802 and thence to the regular conference circuit and is also connectable through leads GT2 and GR2 to grouping hybrid 701.

The other lines are activated in turn in the above manner until all the students for a particular class have been called and added to the conference; it will be assumed that twenty students in turn are called. At the time the last student's line is dialed the corresponding line key at the teacher's console is momentarily again operated whereby to release the corresponding 20T20 relay and connect the line through the associated four-wire terminating set and leads T20 and R20 to its place on regular conference hybrid 803.

*Connection of teacher's telephone set to regular conference*

After the last line has been added and all –T relays (as 2T1; 4T2; 20T20) have released, ground is removed from lead 203 and relay 11TC releases. Relay 11TC, released, removes at make contact 11TC–1(8) the idle line termination across the teacher's talking path through line 804 and connects at the break contacts of transfer pairs 11TC–2(8) and 11TC–3(8) this talking line to the transmit and receive sides of the regular conference circuit. The teacher can now address the "class" as a unit and responses or questions by any of the students will be heard by the teacher and by all of the other students. Signals received on any of the conferenced lines are amplified by the incoming amplifier 807 and the common amplifier 808, the latter preferably being a compressor type amplifier which acts to minimize the variations of incoming signal levels. Resistance pad 811 brings the signals back down to line level for reception by the teacher's telephone set. The out amplifier 812 provides gain for the signal applied to the transmit leg. The signals received on the line from an outlying station pass over leads T and R from the four-wire terminating set, through microphone amplifier 303 and transmit amplifier 208 and are transmitted through coupling transformer 211 to leads R1 and T1 for application to the hybrid. When the system is switched for outgoing speech, the teacher's voice currents are passed by transformer 211 to receive amplifier 304, through transformer 311 to the four-wire terminating set and thence to leads T2 and R2 of the line for transmission to the outlying stations. The switchguard amplifier 312 and transmit control and noise threshold amplifier 313 operate as above described and as described in the speaker-phone patent and article previously referred to.

*Voice identification lamp*

As previously pointed out above, it is desirable that the teacher be able to quickly identify a particular student who is speaking at a given moment, that is to identify a particular line circuit which is carrying speech energy. Also, in the presence of objectionable noise it is important that the teacher be able to quickly identify the offending line. Such identification has proved difficult in prior use of conference systems particularly when a relatively large number of lines are involved. In home-to-school teaching systems it is particularly important for reasons discussed above that the teacher be able to quickly and accurately identify the particular student or students who speak. It is likewise important that the teacher be able to accurately pinpoint a line which is producing noise, particularly if the noise is due to mischievous actions on the part of a student.

According to the novel arrangements contemplated by the present invention a visual signal, referred to herein as a voice identification lamp, is associated with each line circuit. This lamp will light when the associated line is carrying speech energy or noise of an objectionable level but will not light, however, in the presence of ordinary crosstalk, background noise or noise below an objectionable level. These lamps may be grouped at a point convenient to the teacher's observance, for example, they may be positioned on, or adjacent to, the dialing device 108; in the illustrative embodiment of the invention the lamps are shown directly in the respective line circuits in order to avoid undue complication of the drawing.

The voice identification lamp 317 (VI–I) of line circuit No. 1 is controlled by a transistor ON–OFF switch which includes two PNP transistors 318 and 331. It will be noted that the input to the ON–OFF switch is connected through resistor 332 to a point which is in parallel to the connection via lead 333 to switchguard amplifier 312 and via lead 334 to transmit amplifier 208. This is a particularly significant feature of the contemplated novel arrangement since it has been noted that at this particular point of connection the sound level, when the circuit is quiescent, is that of normal crosstalk or nonobjectionable noise.

In the specific illustrative embodiment of the invention the circuit characteristics are assumed to be such that a voltage of approximately four volts is existent at the connection point just mentioned when there is no signal input or when such level is below the switching point set by noise and threshold level amplifier 313. Under this condition the transistor switch remains OFF. However, when a signal above the threshold level appears on the input of transmit amplifier 208 from the application of speech to leads T and R of the four-wire terminating set for example, the voltage increases. When this voltage reaches a designated value, for example, six volts, transistors 318 and 331 are turned ON to ground through Zener diode 337. With transistor 331 conducting, voice identification lamp 317 lights over an obvious path and identifies line circuit No. 1 as one carrying speech or noise above the threshold level.

Similar voice identification lamps are associated with each of the other line circuits so that the teacher is able to quickly and accurately identify the particular line or lines upon which speech or objectionable noise is present at a given moment. As mentioned above the lamps may be mounted at any point convenient to the teacher's observation. The novel method of connecting each lamp with respect to elements of the respective line circuit which has just been described is particularly desirable since the lamps are not energized by crosstalk energy alone or by noise which is below the established threshold value and is unobjectionable. Also, because of the interlocking function of threshold amplifier 313 and the other amplifiers of the line circuit, changes in the background noise level are automatically compensated for so that the teacher is relieved of the task of manually adjusting the indicating circuit to compensate for such changes in level.

As pointed out above the circuits distinguish between background noise and legitimate speech on the basis that speech fluctuates more rapidly than most types of noise; thus the circuits are provided with means for inhibiting the effect of slowly varying noise thereon. In view of the point of connection of the voice identification lamps their operation is also rendered substantially immune to the effect of these slowly varying noise waves.

*Group conference established*

After a regular conference has been established, it may become desirable on occasion to transfer certain of the student's lines from the regular conference to a separate group conference. In the specific illustrative embodiment of the invention the arrangement is such that a maximum of ten lines may be transferred to a first separate group and a maximum of ten lines to a second separate group. Specifically, lines 1 to 10 are connectable to conference group 0 and lines 11 to 20 are connectable to conference group 1. As will be described subsequently, the teacher may establish a talking connection with either of the two separate groups.

In order to initiate establishment of a group conference by transfer of student's lines to the first of two grouping circuits provided, the GRP0 key (grouping key for group 0) provided on the teacher's console is momentarily operated. This closes an operate path for relay 6GC0 from the ground on lead 1107, closed contacts of key GRP0, lead A26, break contact of transfer pair 6GC0–4(6), winding of relay 6GC0, resistor 601 to battery; relay 6GC0 operates and locks to ground at the make contact of transfer pair 6GC0–4(6). Relay 6GC0, operated, closes at make contact 6GC0–5(6) an abvious operate path for relay 6GP0.

Now when the GRP0 key is released and the shunting ground for relay 6GCA0 is removed from lead A26, relay 6GCA0 operates from battery, resistor 602, winding of relay 6GCA0, make contact of transfer pair 6GC0–4(6) to ground. Relay 6GCA0, operated, closes at make contact 6GCA0–12(6) an obvious operate path for relay 6ST. Relay 6ST, operated, closes at make contact 6ST–1(10) an energizing path for interrupter motor 1001 and grouping lamp GRP0 is now flashed as indication that grouping circuit 0 is in condition for the transfer of lines; the flashing circuit is traced from the power source 1007, interrupter contact INT–16(10), make contact of transfer pair 6GCA0–8(10), lead L16, lamp GRP0 to ground. Also, the line lamps of all lines connected to the regular conference circuit are extinguished; for example, the "steady" energizing path through make contact 2L1–1(10) for line lamp No. 1 is interrupted at the break contact of transfer pair 6GC0–1(10).

The teacher now operates the line key of the first line selected for transfer to conference group 0; it is assumed that line No. 1 is selected and accordingly line key No. 1 is closed. The ground applied to lead A11 operates the associated grouping relay 2G1 through make contact 6GP0–1(2), break contact of transfer pair 2G1–4(2), winding of relay 2G1, resistor 212, make contact 2L1–12(2) to battery; relay 2G1 upon operating locks ground through the make contact of transfer pair 2G1–4(2). Relay 2G1, operated, closes at the make contacts of transfer pairs 2G1–3(2) and 2G1–5(2) a path for transferring line circuit No. 1 through leads GT1 and GR1 to an appearance on grouping hybrid 701 for connection to the IN and OUT channels of group conference circuit 0.

Now when the line key is released and the shunting ground for relay 2GA1 is removed from line A11, relay 2GA1 operates from battery, make contact 2L1–12(2) resistor 213, winding of relay 2GA1, make contact of transfer pair 2G1–4(2) to ground. Relay 2GA1, operated, closes at make contact 2GA1–20(2) an idle-line termination shunt path across the regular conference hybrid connection of line circuit No. 1 and removes at break contact 2GA1–9(2) the idle-line termination shunt path previously connected across the group hybrid connection of the same line. Also, a path is now closed for lighting line lamp No. 1 "steady" from source 1002, make contact of transfer pair 6GC0–1(10), make contact of transfer pair 2GA1–12(10), make contact 2L1–1(10), break contact of transfer pair 2TA1–8(10), line L11, line lamp No. 1 to ground.

Additional lines are transferred to group conference circuit 0 in the manner just described; any of the first ten line circuits may be so transferred.

Figure 7:
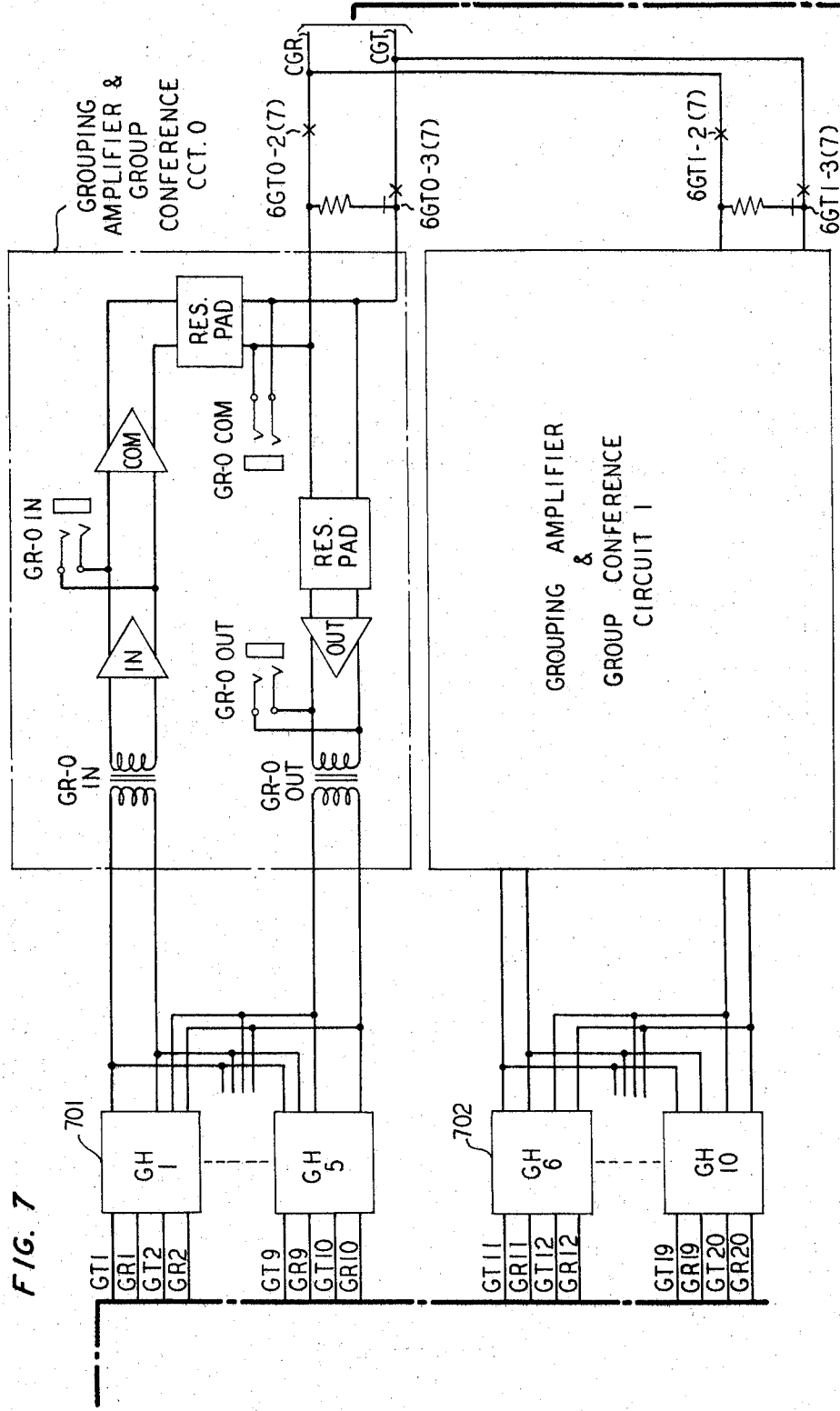
FIG. 7 shows particularly the two grouping amplifier and group conference circuits, the equipment of the second circuit and of the grouping hybrids being indicated by captioned boxes and certain of the intervening hybrids being indicated only by dotted lines.
Figure 8:
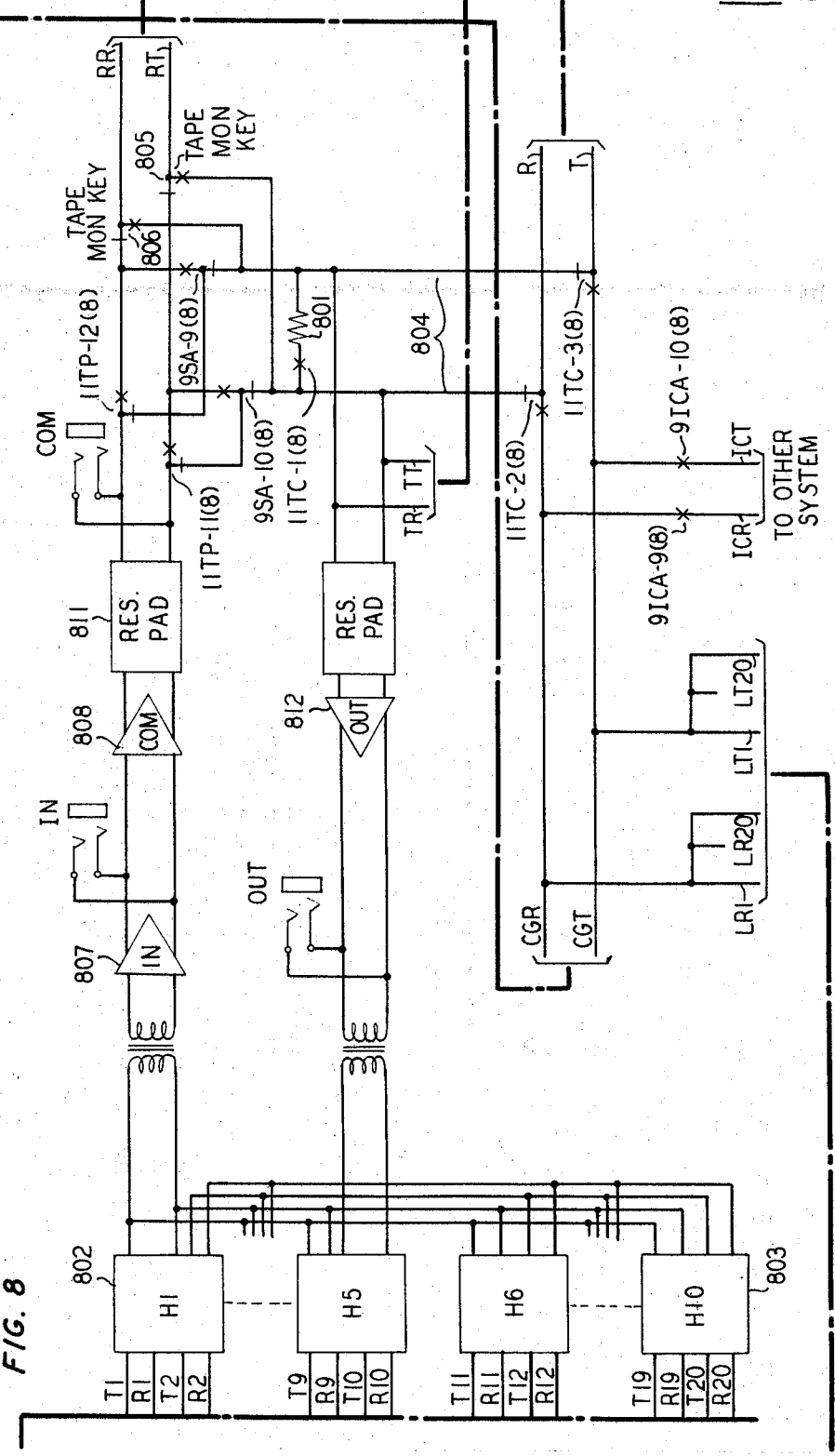
FIG. 8 shows particularly the common amplifier and line bridging circuit for the regular conference circuit the regular hybrids being shown as captioned boxes and certain intervening hybrids being indicated by dotted lines.
Figure 9:
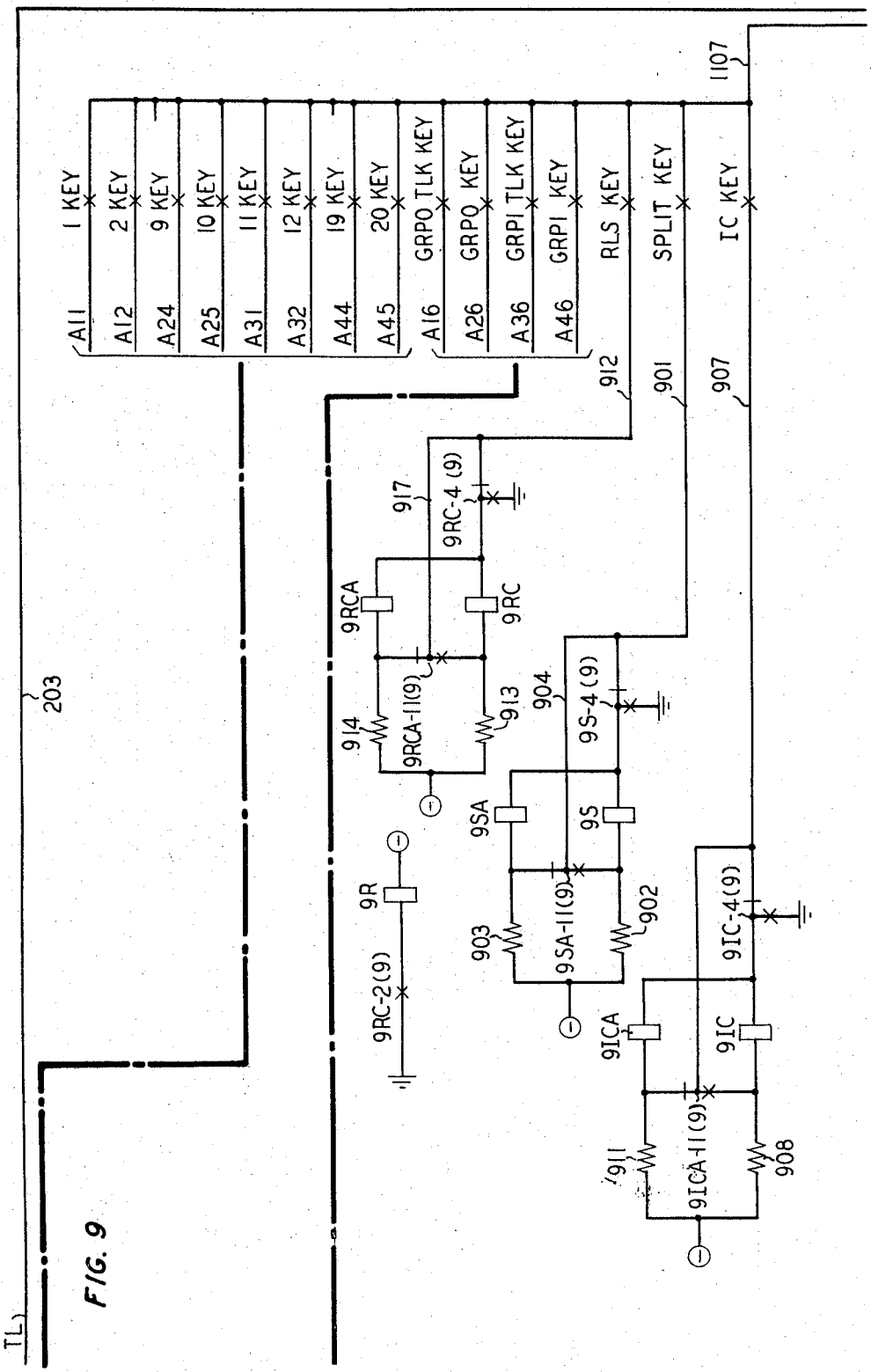
FIG. 9 shows particularly the key circuit of the teaching console.
Figure 10:
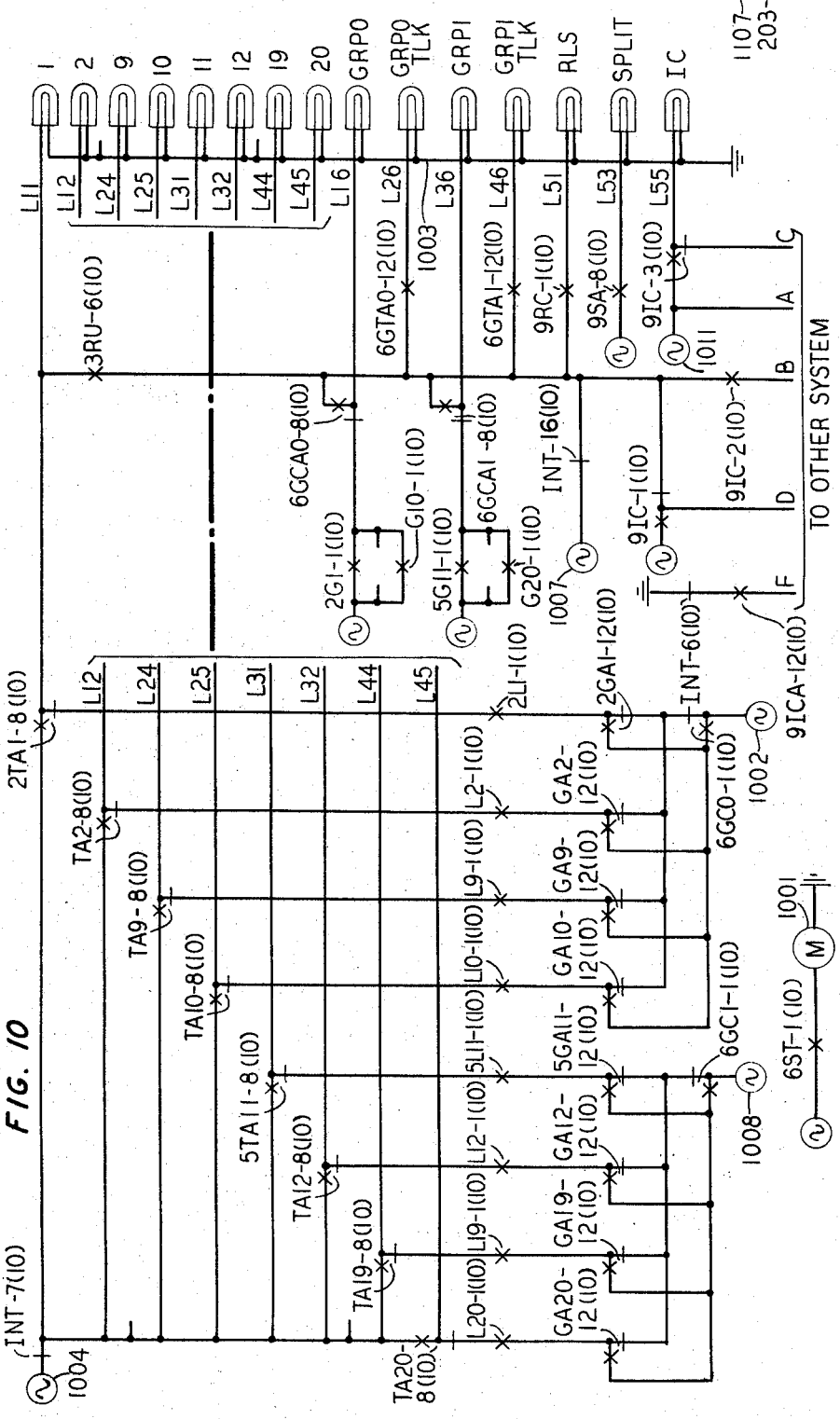
FIG. 10 shows particularly the lamp circuit of the teaching console including the interrupter contact paths.
Figure 11:
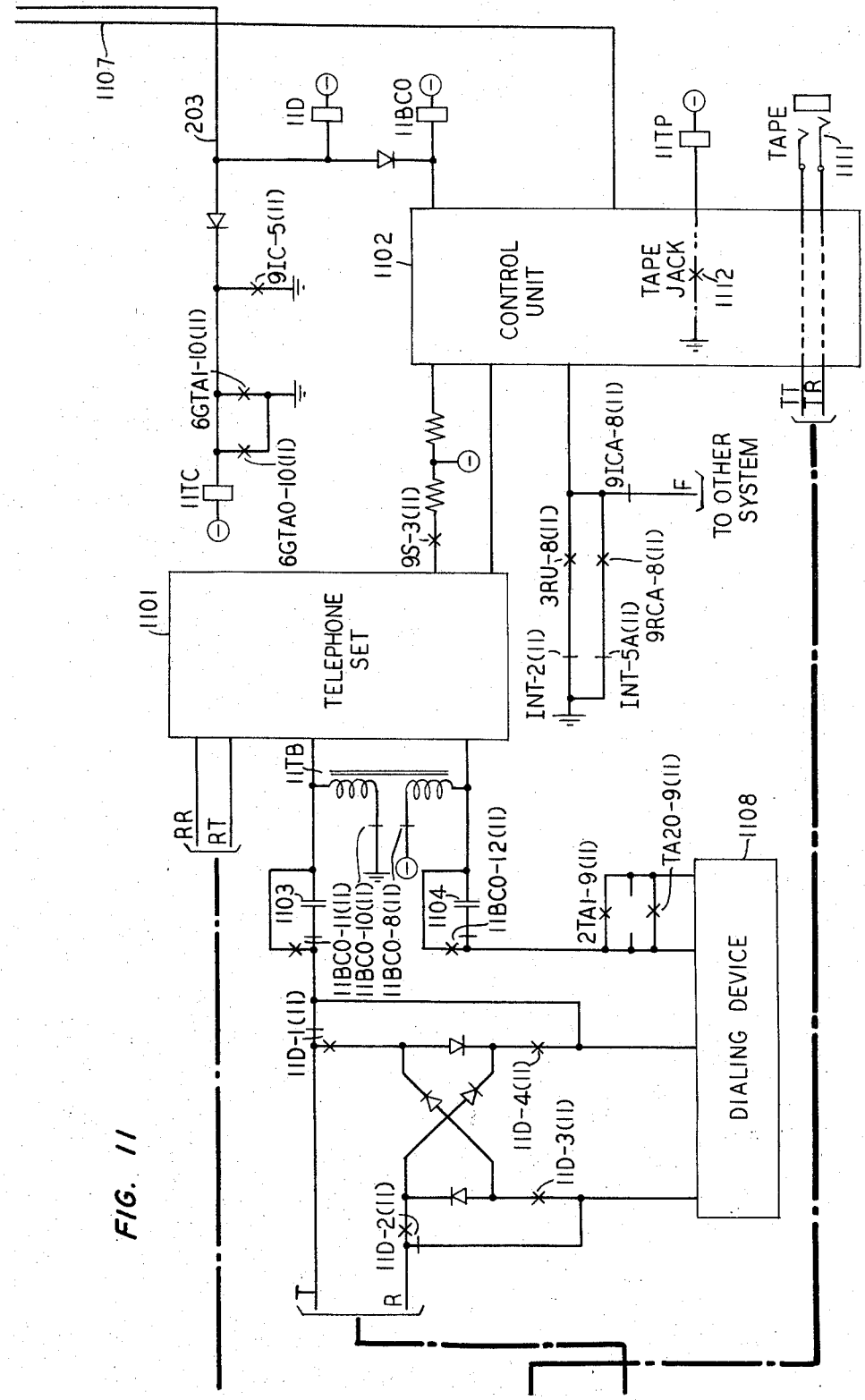
FIG. 11 shows particularly the telephone set and dialing circuits of the teaching console.

Lines of the group 11–20 may also be transferred to a group conference but in this instance the transfer must be to the second group conference circuit, that is group conference circuit No. 1 (FIG. 7). Transfers are effected in a manner generally similar to that just described but are initiated by operation of key GRP1 rather than key GRP0.

Assuming that line circuit No. 11 is to be transferred, GRP1 key is closed whereby to apply ground to lead A46; relay 6GC1 operates from this ground through the break contact of transfer pair 6GC1–4(6), winding of relay 6GC1, resistor 603 to battery. Relay 6GC1 upon operating locks to ground at the make contact of transfer pair 6GC1–4(6). When the GRP1 key is released relay 6GCA1 operates from battery, resistor 604, winding of relay 6GCA1, make contact of transfer pair 6GC1–4(6) to ground.

Relay 6GCA1, operated, closes at make contact 6GCA1–12(6) an obvious operate path for relay 6ST which operates and closes at make contact 6ST–1(10) an energizing path for interrupter motor 1001.

Relay 6GC1, operated, closes at make contact 6GC1–5(6) an operate path for relay 6GP1; relay 6GP1, operated, closes at make contact 6GP1–1(5) a path for operating relay 5G11 from the ground applied to lead A31 by operation of line key No. 11. Relay 5G11, upon operating, locks to ground at the make contact of transfer pair 5G11–4(5) and closes at make contacts, not shown but corresponding to make contacts of transfer pairs 2G1–3(2) and 2G1–5(2) of line circuit No. 1, a path for connecting line circuit No. 11 via leads GT11 and GR11 to an appearance on grouping hybrid 702 for connection to group conference circuit No. 1. Similarly, relay 5GA11, corresponding to relay 2GA1 of line circuit No. 1 and operating when line key No. 11 is released and ground removed from lead A31, removes the idle line termination (not shown) from leads GT11 and GR11 and connects a similar termination across leads T11 and R11.

Similar to the action described above in reference to the transfer of line circuit No. 1, lamp GRP1 is flashed after the interrupter is set into operation from source 1007, interrupter contact INT–16(10), make contact of transfer pair 6GCA1–8(10) lamp GRP1 to ground. Following operation of relay 6GC1, line lamp No. 11 of the line being transferred is de-energized at break contact of transfer pair 6GC1–1(10); following operation of relay 5GA11, however, this lamp is lighted steady from source 1008, make contact of transfer pair 6GC1–1(10), make contact of transfer pair 5GA11–12(10), make contact 5L11–1(10), break contact of transfer pair 5TA11–8(0), lead L31, line lamp No. 11 to ground.

*Teacher connects to group conference circuit*

The teacher may establish a talk connection to either of the group conference circuits, such a connection to group conference circuit 0 being initiated by operation of GRP0 TLK key provided on the teacher's console and initiation of a connection to group conference circuit No. 1 being initiated by operation of GRP1 TLK key. It will be assumed, first, for purposes of description that GRP0 TLK key is operated thereby applying ground to lead A16. The ground on lead A16 operates relay 6GT0 through the break contact of transfer pair 6GT0–4(6), winding of relay 6GT0, resistor 607 to battery; relay 6GT0 operates and locks to ground through the make contact of transfer pair 6GT0–4(6). Relay 6GT0, operated, removes at the break contact of transfer pair 6GT0–3(7) the idle-line termination from across leads CGR and CGT and closes through these leads at the make contact of the same transfer pair and make contact 6GT0–2(7).

When the group talk key is released and ground removed from lead A16, relay 6GTA0 operates from battery, resistor 608, winding of relay 6GTA0, make contact of transfer pair 6GT0–4(6) to ground. Relay 11TC now operates from ground, make contact 6GTA0–10(11), winding of relay 11TC to battery. Relay 11TC, operated, connects at make contact 11TC–1(8) an idle-line termination across line 804 of the regular conference circuit and connects the teacher's talking circuit through the respective make contacts of transfer pair 11TC–2(8) and 11TC–3(8) over leads CGR and CGT to the IN and OUT channels of group conference circuit 0. [As previously described leads CGR and CGT are connected through to group conference circuit 0 via make contact 6GT0–2(7) and the make contact of transfer pair 6GT0–3(7).]

Relay 11TC upon operating also closes at make contact 11TC–12(6) an operate path for relay 6ST which operates and closes at make contact 6ST–1(10) the energizing path of interrupter motor 1001. The GRP0 TLK lamp now flashes as indication that the teacher has talking connection with group conference circuit 0, the lamp flashing path being from source 1007, interrupter contact INT–16(10), make contact 6GTA0–12(10), lead L26, GRP0 TLK lamp to ground.

Connection of the teacher's talking path to group conference circuit No. 1 would be established in a similar manner, such connection being initiated by operation of GRP1 TLK key and involving relays 6GT1 and 6GTA1 rather than relays 6GT0 and 6GTA0. In this instance the CGR and CGT leads (FIG. 7) would be connected through to group conference circuit No. 1 via make contact 6GT1–2(7) and make contact of transfer pair 6GT1–3(7) rather than to group conference circuit 0.

Release functions

In order to release the teacher's talk circuit from either group circuit the corresponding group talk is reoperated. For example, to release from circuit 0 the GRP0 TLK key is momentarily reoperated. This releases relay 6GT0 by shunting the operate battery to ground on lead A16 by way of resistor 607, make contact of transfer pair 6GTA0–11(6) and lead 611; release of relay 6GT0 is followed by release of relay 6GTA0 when the GRP0 TLK key is released and ground removed from lead A16 [the holding ground having been lost at the make contact of transfer pair 6GT0–4(6)]. Relay 11TC releases following release of relay 6GTA0 the operate path being interrupted at make contact 6GTA0–10(11).

Relay 11TC, released, removes at make contact 11TC–1(8) the idle-line termination from line 804 and reconnects at the break contacts of transfer pairs 11TC–2(8) and 11TC–3(8) the teacher's talk path over line 804 to the regular conference circuit. Also relay 11TC, released, releases relay 6ST and the interrupter operation stops and the flashing GRP0 TLK lamp is extinguished.

In order to release from the grouping feature, established as above described, the respective grouping key is momentarily reoperated. For example, to release group conference circuit 0, GRP0 key is reoperated. This releases relay 6GC0 by shunting the operate battery to ground on lead A26 through resistor 601, the make contact of transfer pair 6GCA0–11(6), and lead 612. Release of relay 6GC0 is followed by release of relay 6GP0 as the operate path thereof is interrupted at make contact 6GC0–5(6). Release of relay 6GP0 releases the individual grouping control relays, for example, it releases relay 2G1 of line circuit No. 1 by interrupting the operate path thereof at make contact 6GP0–1(2). When key GRP0 is released and ground removed from lead A26, relay 6GCA0 releases [the holding ground at the make contact of transfer pair 6GC0–4(6) having been lost]. Relay 6GCA0, released, releases relay 6ST which, in turn opens the operate path of interrupter motor 1001 and extinguishes the GRP0 lamp.

When an individual line is to be released from a group conference circuit, the circuit is seized as described above in connection with setting-up a conference group. When the grouping lamp starts flashing, indicating that the circuit has been seized, the line key of the line to be removed from the grouping circuit is momentarily operated. For example, it will be assumed that line circuit No. 1 is to be released from group conference circuit 0. Accordingly, when GRP0 lamp starts to flash, line key No. 1 is momentarily operated. This releases relay 2G1 by shunting the operate battery to the ground on lead A11 through resistor 212, make contact of transfer pair 2GA1–11(2), lead 214, and make contact 6GP0–1(2). Relay 2G1, released, reconnects at the break contacts of transfer pairs 2G1–3(2) and 2G1–5(2) line circuit No. 1 via leads R1 and T1 to its previous appearance on regular hybrid 802 for connection to the IN and OUT channels of the regular conference circuit. When the line key is released removing ground from lead A11, relay 2GA1 releases, removes at make contact 2GA1–20(2) the idle-line termination from the connection to the regular conference hybrid, and restores at break contact 2GA1–9(2) the idle-line termination across the connection to the group conference hybrid. Other lines, as desired, are removed in turn from the group conference circuits and reconnected to the regular conference circuit in the manner just described.

Split conference

In certain instances, it may become desirable to operate the system on a "split conference" basis, that is to provide two-way conversation between the teacher and the students only; that is student-to-student conversation is eliminated. In order to initiate such a connection the SPLIT key provided on the teacher's console is momentarily closed whereby to apply ground from lead 1107 to lead 901. Relay 9S operates from this ground through the break contact of transfer pair 9S–4(9), winding of relay 9S, resistor 902 to battery and, upon operating, locks to the ground at the make contact of transfer pair 9S–4(9). Relay 9S, operated, operates a relay (not shown) in teacher's telephone set 1101 whereby to temporarily switch the telephone set from two-wire circuitry to four-wire circuitry.

When the SPLIT key is released and ground removed from lead 901, relay 9SA operates from battery, resistor 903, winding of relay 9SA to ground at the make contact of transfer pair 9S–4(9). Relay 9SA, operated, interrupts at the respective break contacts of transfer pairs 9SA–9(8) and 9SA–10(8) the connection between the IN and OUT channels of the regular conference circuit normally provided by line 804. The teacher can now transmit on a two-wire basis to the students over leads R and T and a portion of line 804 to the OUT channel and can receive from the IN channel also on a two-wire basis on leads RR and RT. Student-to-student communication is prevented, however, due to the interruption of line 804 by operation of relay 9SA. The SPLIT lamp is lighted at this time over an obvious path closed at make contact 9SA–8(10).

In order to release from the SPLIT function the SPLIT key is reoperated momentarily whereby to again apply ground to lead 901. This releases relay 9S as the operate battery is shunted by the ground on lead 901 through resistor 902, make contact of transfer pair 9SA–11(9) and lead 904. Relay 9S, released, releases the relay in the teacher's telephone set referred to above and restores the telephone set to its normal two-wire operation. Relay 9SA releases when the SPLIT key is released and the ground removed from lead 901; relay 9SA restores at break contacts of transfer pairs 9SA–9(8) and 9SA–10(8) the normal connecting path via line 804 between the IN and OUT channels of the regular conference circuit. The SPLIT lamp is extinguished upon release of relay 9SA.

Talk connection to individual student

It will frequently become desirable during a class conference period that the teacher be able to talk with an individual student to the exclusion of the other students. The present novel circuit arrangement provides such a service in a manner now described.

It will be assumed for purposes of further description that the teacher wishes to be connected on an individual basis to the student connected to the regular conference circuit by way of line circuit No. 1. Line key No. 1 is accordingly operated whereby to apply ground to lead A11. This ground is applied over lead 207 and the break contact of transfer pair 2T1–4(2), through the winding of relay 2T1, resistor 202, make contact 2L1–7(2), break contacts 6GC0–3(2), 6GC1–3(2), 9RCA–12(2) to battery; relay 2T1 operates over this path.

Relay 2T1, operated, connects ground to lead 203 through the make contact of transfer pair 2T1–3(2) which ground is effective to operate relay 11BC0 at the teacher's position. Also, relay 11TC operates from this ground. Relay 11BC0, operated, removes at break contacts 11BC0–8(11) and 11BC0–10(11) talking battery and ground from inductor 11TB.

Relay 11TC, operated, closes at make contact 11TC–12(6) an operate path for relay 6ST; connects at make contact 11TC–1(8) an idle-line termination for the teacher's talk path at the regular conference amplifier circuit; and transfers the T and R leads of the teacher's talking path from the regular conference circuit to leads T2 and R2 of line circuit No. 1 by way of leads LT1 and RT1 (FIG. 8) and the make contacts of transfer pairs 2T1–2(3) and 2T1–1(3); the talking path of the teacher's console is now under control of the individual line circuit No. 1.

When the No. 1 line key is released and ground removed from lead A11, relay 2TA1 operates through make contact of transfer pair 2T1–4(2) to the ground on lead 203. Line lamp No. 1 is now flashed as indication that the individual line connection has been completed, the lamp energizing path being traced from source 1004, interrupter contact INT–7(10), to make contact of transfer pair 2TA1–8(10), line lamp No. 1 to ground.

In order to restore line No. 1 to the regular conference connection the corresponding line key is again operated momentarily; this applies ground to lead A11 and releases relay 2T1 by shunting the operate battery through the make contact of transfer pair 2TA1–11(2) and lead 204. Relay 2T1, released, releases relays 11BC0 and 11TC; the release of relays 6ST and 2TA1 follows and line No. 1 is restored to its connection to the regular conference circuit.

*Intercom connection*

The system of the illustrative embodiments is arranged for connection when desirable with a second similar system located on the same premises. Since the general arrangement of the two systems is the same the second system is not shown in the drawing although the portions of the first system that would be involved in an interconnection of the two systems are fully disclosed.

In order to initiate a connection with a second system, the teacher closes the IC (intercom) key at the teacher's console whereby to apply ground to lead 907 and operate relay 9IC through the break contact of transfer pair 9IC–4(9), winding of relay 9IC, resistor 908 to battery; relay 9IC, upon operating locks to ground through the make contact of transfer pair 9IC–4(9). Relay 9IC, operated, closes at the make contact of transfer pair 9IC–3(10) a path from source 1011 for lighting lamp IC and closes at make contact 9IC–5(11) an operate path for relay 11TC.

Relay 11TC, operated, closes at make contact 11TC–12(6) an operate path for relay 6ST whereby to energize the interrupter motor and also closes at make contact 11TC–1(8) an idle-line termination across the regular conference common amplifier circuit.

When the interrupter starts, the IC lamps of both systems are flashed over a path not shown but similar to the lamp paths illustrated and previously described above.

When the teacher releases the IC key and removes ground from lead 907, relay 9ICA operates from battery, resistor 911, winding of relay 9ICA, make contact of transfer pair 9IC–4(9) to ground. Relay 9ICA, operated, closes at make contacts 9ICA–9(8) and 9ICA–10(8) a path over leads ICR and ICT for extending the teacher's talking path to that of the other system. Through momentary operation of the intercom key of the other system, paths (not shown) are closed for connecting the teacher's talking paths of the two systems.

Release of interconnection of the two systems and restoral of each to normal condition is initiated by a momentary reoperation of key IC; this is followed by release of relays IC, TC and ST and release of relay 9ICA follows release of the IC key.

*Connection of tape recorder*

A tape recorder may be connected if desired to the OUT channel of the regular conference by plugging into jack 1111; this closes contact 1112 and operates relay 11TP. The tape jack is connected via leads TT and TR to the OUT channel. Relay 11TP, operated, interrupts at the break contacts of transfer pair 11TP–11(8) and 11TP–12(8) line 804 so that incoming signals will be prevented from reaching the tape jack 1111.

The output level of the tape recording may be monitored at the teacher's console by operating the tape monitoring key whereby to connect leads RR and RT of the teacher's telephone set to the OUT channel via the make contacts of transfer pairs 805 and 806 of the monitoring key. For this function the teacher's telephone set must momentarily be shifted to four-wire operation as described above in reference to split conference operation.

The circuits restore to normal when the tape plug is removed from jack 1111 and relay 11TP releases.

*Incoming call—line circuit No. 1 only*

The first line, that is line circuit No. 1, and the first line only, is arranged to receive incoming calls in addition, of course, to the function common to all the lines of handling outgoing calls. This additional function allocated to the first line allows the transferring of the teaching procedure to a remote location such as the school auditorium. In such event the assigned telephone number of the first line would be dialed from the remote location and the incoming call would be answered by the teacher and treated as if it were a connection on any of the student's lines.

Ringing applied to line circuit No. 1 in the usual manner will operate relay 3RU through the upper winding thereof and the break contacts of respective transfer pairs 2L1–9(3) and 2L1–11(3). In the event the teaching position is unoccupied, relay 3RU releases when the calling party goes on-hook. If the teaching position is occupied and any lines are connected to the system, however, relay 3RU will lock-up; for example, if line circuit No. 2 is connected to the system, relay 3RU, upon operation, will lock through its make contact 3RU–4(3), break contact 2L1–2(3), make contact 2L2–6(3) to ground.

Relay 3RU, operated, closes at make contact 3RU–10(6) an operate path for relay 6ST, whereby to start operation of the interrupter, and closes at make contact 3RU–8(11) an operate path through control unit 1102 for a buzzer or other signaling device provided at the teacher's console. Now with the interrupter operating, the signaling device will be operated through interrupter contact INT–2(11), and line lamp No. 1 will be flashed over a path from source 1007, interrupter contact INT–16(10), make contact 3RU–6(10), line lamp No. 1 to ground.

In order to answer the incoming call on line circuit No. 1 the teacher momentarily closes the corresponding line key which applies ground to lead A11 and operates relay 2L1. Relay 2L1 operated interrupts the operate path of relay 3RU at the break contacts of transfer pairs 2L1–9(3) and 2L1–11(3), connects the T2 and R2 leads through to the four-wire terminating set 301, and also interrupts at break contacts 2L1–2(3) the locking path of relay 3RU whereby to release the relay. Relay 3RU, released, releases relay 6ST whereby to stop the interrupter; opens at make contact 3RU–8(11) the operate path for signaling device associated with control unit 1102 and opens at make contact 3RU–6(10) the energizing path for line lamp No. 1.

The call on line circuit No. 1 may now be treated as a call on any of the other lines of the system.

Release of lines from system

Release of a line or lines from the system is initiated by momentary operation of the release key RLS whereby to apply ground to lead 912 and operate relay 9RC through the break contact of transfer pair 9RC–4(9) winding of relay 9RC, resistor 913 to battery; relay 9RC operates and locks to ground through the make contact of its transfer pair 9RC–4(9). Relay 9R operates over an obvious path through make contact 9RC–2(9) and in turn closes at make contact 9R–24(6) an operate path for relay 6ST whereby to start the interrupter. RLS lamp is now flashed over a path from source 1007, interrupter contact INT–16(10), make contact 9RC–1(10), lamp RLS to ground.

When RLS key is released and ground removed from lead 912, relay 9RCA operates from ground, resistor 914, winding of relay 9RCA to ground at the make contact of transfer pair 9RC–4(9). Relay 9RCA, operated, removes at break contact 9RCA–12(2) battery from lead 218. Assuming that line circuit No. 1 is the first to be released, line key No. 1 is momentarily operated. Relay 2L1 now releases as the holding battery therefor through resistor 201 is shunted through make contact 9R–1(2) to ground on lead A11 applied through operation of line key No. 1. Relay 2L1, released, removes at the make contacts of transfer pairs 2L1–9(3) and 2L1–11(3) the loop to the central office and the line connected to student's telephone set 314 is removed from the conference. Momentary reoperation of the RLS key releases relay 9RC as the holding battery is shunted through lead 917 to the ground on lead 912. Release of relay 9RCA follows release of key RLS and removal of the ground on lead 912 as the holding ground has been lost at the make contact of transfer pair 9RC–4(9). Lamp RLS is extinguished, the signaling device associated with control unit 1102 silenced and the circuit is restored to normal.

Other lines are removed from the conference circuit as desired and in the manner just described.

It will be understood, of course, that the voice identification lamps are effective, and operate in the manner described, for the various circuit arrangements described, that is regular conference, group conference, split conference, and so on. In the instance of the connection to an individual student, however, the voice identification lamp is disabled until the student is again connected to one of the conference bridges.

It is to be understood that the above-described arrangements are illustrative of the application of the principles of the invention. Numerous other arrangements may be devised by those skilled in the art without departing from the spirit and scope of the invention.

What is claimed is:

1. In a school-to-home intercommunication system, a central teacher's station and a plurality of remote home stations, a plurality of line circuits at the central teacher's station, means for selecting said line circuits in turn and for completing connections thereover between the central teacher's station and selected remote stations, a plurality of indicators at said central station associated respectively with said line circuits and operative to indicate the presence of speech energy on the respectively associated line circuit, a voltage responsive control switch for each of said indicators, and means for connecting each switch to a point in the associated line circuit at which during quiescent periods of the circuit the sound level is that of normal crosstalk or nonobjectionable noise and at which the voltage is increased substantially by the presence of speech energy on the line circuit.

2. In a school-to-home intercommunication system, the combination defined by claim 1 further characterized in that said indicators comprise lamps having energizing paths therefor and that said voltage responsive control switches comprise transistor OFF–ON circuits for controlling the respective energizing paths.

3. In a school-to-home intercommunicating system, the combination defined by claim 2 further characterized in the provision of means for rendering said indicators immune to the effect of slowly varying noise waves applied to the respective line circuits.

4. In a school-to-home intercommunicating system, a central teacher's station and a plurality of remote home stations, a plurality of line circuits at the central teacher's station, means for selecting said line circuits in turn and for completing connections over lines between the central teacher's station and selected remote stations, each of said line circuits including a transmitting channel, a receiving channel and a transformer for connecting said channels to a two-wire portion of the respective line, voice controlled means associated with each of said lines for switching the direction of transmission between said transmitting channel and said receiving channel, visual indicating means associated respectively with each of said lines and operative to indicate the presence of speech energy on the respectively associated line, a plurality of amplifiers connected in each of said line circuits, a voltage responsive switch for each of said visual indicating means, and means for connecting each of said voltage responsive switches to a point in the connecting path between two of the amplifiers of the respective line circuit at which point during quiescent periods of the circuit the sound level is that of normal crosstalk or nonobjectionable noise and at which the voltage is increased substantially by the presence of speech energy on the line.

5. In a school-to-home intercommunicating system, the combination defined by claim 4 further characterized in that said voltage responsive switches comprise a transistor OFF–ON circuit responsive to the increase in voltage at said point to energize the associated visual indicating means.

6. In a school-to-home intercommunicating system, the combination defined by claim 4 further characterized in that said voice controlled switching means includes means for inhibiting the effect of slowly varying noise waves thereon and in the inclusion of means for subjecting each of said voltage responsive switches to the action of said inhibiting means of the respective line whereby the associated indicating means is rendered immune to the effect thereon of slowly varying noise waves.

7. In an intercommunicating system, a central station and a plurality of remote stations, a plurality of lines for interconnecting said central station and said remote stations, a plurality of indicators at said central station associated respectively with said lines and operative to indicate the presence of speech energy on the respectively associated line, each of said lines including a transmitting channel, a receiving channel and a transformer for coupling said channels to a two-wire portion of the respective line, voice controlled means associated with each line for switching the direction of transmission between said transmitting channel and said receiving channel, said voice controlled means including means for inhibiting the effect of slowly varying noise waves thereon, additional voice controlled means associated with each of said lines for controlling the activation of the respective one of said indicators associated with the line, and means for subjecting each of said additional voice controlled means to action of the inhibiting means of the respective line whereby the indicator is rendered immune to the effect of slowly varying noise waves on the line.

8. In an intercommunication system, a central station and a plurality of remote stations, a plurality of line circuits at said central station, means for selectively connecting said line circuits between said central station and said remote stations, each of said line circuits including a transmitting channel, a receiving channel, voice controlled means associated with each of said line circuits for switching the direction of transmission between said transmitting channel and said receiving channel, transmit amplifier means connected to said transmit channel, receive amplifier means connected to said receive channel, switchguard amplifier means connected to said transmit amplifier and to said receive amplifier, indicating means associated with each said line circuit, and means for operating said indicating means to indicate the presence of speech energy but to distinguish the sound level of normal crosstalk and unobjectionable noise, said last-mentioned means including a voltage responsive switch means for each said indicating means and means for connecting each of said voltage responsive switch means in shunt to the connection between said switchguard amplifier and said transmit amplifier of said associated line circuit.

References Cited

UNITED STATES PATENTS

| | | | |
|---|---|---|---|
| 2,529,069 | 11/1950 | Bernstein | 179—1 |
| 3,370,127 | 2/1968 | Courtney | 179—18 |

OTHER REFERENCES

Post Office Electrical Engineer's Journal, vol. 5, No. 4, January 1966, pp. 250–252.

KATHLEEN H. CLAFFY, *Primary Examiner.*

A. H. GESS, *Assistant Examiner.*

U.S. Cl. X.R.

179—18